United States Patent Office.

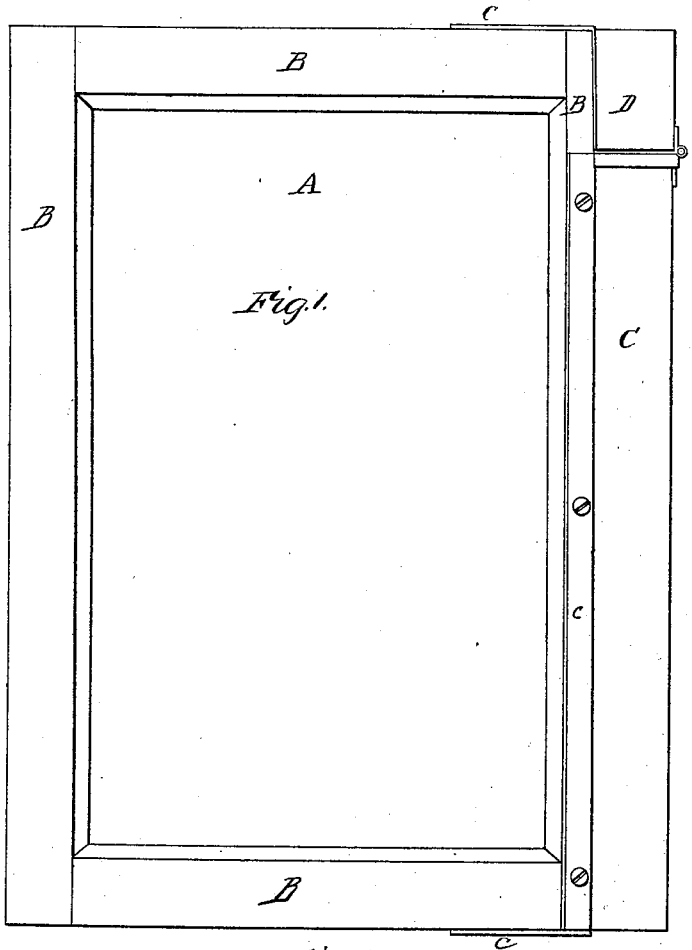

C. JOSEPH WIRTH, OF DANSVILLE, NEW YORK.

*Letters Patent No. 84,522, dated December 1, 1868; antedated November 25, 1868.*

IMPROVEMENT IN SLATE-FRAMES.

The Schedule referred to in these Letters Patent and making part of the same.

*To all whom it may concern:*

Be it known that I, C. JOSEPH WIRTH, of Dansville, in the county of Livingston, and State of New York, have invented a new and useful Improvement in Attachment for School-Slates; and I do hereby declare that the following is a full, clear, and exact description of the same, reference being had to the accompanying drawings, forming part of this specification, and in which—

Figure 1 is a front view, and

Figure 2 represents a sectional view of my invention.

In this invention a rectangular box is attached to the edge of the slate-frame, for the purpose of holding pencils, pens, rulers, &c.

In order that others skilled in the art to which my invention appertains may be enabled to make and use the same, I will proceed to describe it in detail.

In the drawings—

A represents the slate, having a frame, B, around it.

C is a rectangular box, provided with a hinged cover, D, and attached to the edge of the slate-frame by flanges c c, through which nails or screws are driven into the frame.

I do not claim any particular mode of attaching the box to the slate-frame, but may avail myself of any mode of fastening in common use for other purposes, that may appear best suited to this purpose.

The receptacle thus provided and attached to the frame is intended to hold the pens, pencils, rulers, &c., &c., that the scholar may be using, and prevent children from losing or spoiling them, as well as inculcate habits of order and exactness in respect to the care and condition of such articles.

The box C, I would commonly make of sheet-brass, tin, or other thin metal, but I do not intend to confine myself to the use of any particular substance for such purpose.

The box being screwed on, is detachable, and, if not required in any particular case, or at any particular time, may be removed.

I do not claim a slate-frame having a recess and cover for the above purposes. My invention consists in a device for attaching to school-slate frames.

What I claim as new, and desire to secure by Letters Patent, is—

An attachment for school-slate frames, consisting of a narrow oblong metallic box, C, the top of which, D, is hinged to the lower section, forming a cover therefor, said box being provided with narrow flanges, for attaching the same to the outer edge of the slate-frame, for the purposes set forth.

To the above specification of my improvement, I have signed my hand, this 3d day of June, 1867

C. JOS. WIRTH.

Witnesses:
C. R. KERN,
FRANZ STEINHARDT.